(12) United States Patent
Yu

(10) Patent No.: US 9,992,098 B2
(45) Date of Patent: Jun. 5, 2018

(54) CONTENT CENTRIC M2M SYSTEM

(71) Applicant: Orange, Paris (FR)

(72) Inventor: Yifan Yu, Beijing (CN)

(73) Assignee: ORANGE, Paris (FR)

( * ) Notice: Subject to any disclaimer, the term of this patent is extended or adjusted under 35 U.S.C. 154(b) by 204 days.

(21) Appl. No.: 14/388,692

(22) PCT Filed: Mar. 29, 2013

(86) PCT No.: PCT/IB2013/000706
§ 371 (c)(1),
(2) Date: Sep. 26, 2014

(87) PCT Pub. No.: WO2013/144716
PCT Pub. Date: Oct. 3, 2013

(65) Prior Publication Data
US 2015/0095514 A1      Apr. 2, 2015

(30) Foreign Application Priority Data
Mar. 31, 2012   (WO) ................ PCT/CN2012/073383

(51) Int. Cl.
*G06F 15/173*     (2006.01)
*H04L 12/721*     (2013.01)
(Continued)

(52) U.S. Cl.
CPC ........ *H04L 45/14* (2013.01); *G06F 17/30424* (2013.01); *G06F 17/30861* (2013.01);
(Continued)

(58) Field of Classification Search
None
See application file for complete search history.

(56) References Cited

U.S. PATENT DOCUMENTS 7,054,855 B2      5/2006  Basso et al.
2005/0091402 A1*  4/2005  Satagopan .......... G06F 17/3089
                                                      709/245

(Continued)

FOREIGN PATENT DOCUMENTS

CN      102111328 A     6/2011
WO       03005288 A     1/2003

OTHER PUBLICATIONS

International Search Report and Written Opinion dated Sep. 16, 2013 for corresponding International Patent Application No. PCT/IB2013/000706, filed Mar. 29, 2013.

(Continued)

*Primary Examiner* — Phyllis A Book
(74) *Attorney, Agent, or Firm* — David D. Brush; Westman, Champlin & Koehler, P.A.

(57) ABSTRACT

A method for routing data at a first node of a network including a second node. The method includes: providing the first node with a database storing an association between: an URL component identifying content at the first node, and a unique identifier associated to the second node, the unique identifier being specified by the second node; registering content locally stored in the second node by storing in the database an association between an URL component identifying the locally stored content and the unique identifier of the second node; and, upon reception from a requesting entity, by the first node, of a content request having a content identifier, the method includes: checking in the database whether the content identifier includes the URL component, and forwarding the content request to the second node if the content identifier includes the URL component associated with the unique identifier of the second node.

13 Claims, 8 Drawing Sheets

(51) Int. Cl.
*G06F 17/30* (2006.01)
*H04W 40/10* (2009.01)
*H04L 12/725* (2013.01)
*H04W 4/00* (2018.01)

(52) U.S. Cl.
CPC ........... *H04L 45/306* (2013.01); *H04W 4/005* (2013.01); *H04W 40/10* (2013.01)

(56) References Cited

U.S. PATENT DOCUMENTS

| | | | | |
|---|---|---|---|---|
| 2006/0114832 | A1* | 6/2006 | Hamilton | H04L 12/2602 370/244 |
| 2006/0167975 | A1* | 7/2006 | Chan | H04L 67/2819 709/203 |
| 2007/0249319 | A1* | 10/2007 | Faulkner | H04L 1/22 455/402 |
| 2009/0285209 | A1 | 11/2009 | Steward et al. | |
| 2009/0287835 | A1 | 11/2009 | Jacobson | |
| 2009/0288163 | A1* | 11/2009 | Jacobson | G06F 15/173 726/22 |
| 2010/0169503 | A1 | 7/2010 | Kollmansberger et al. | |
| 2011/0090908 | A1 | 4/2011 | Jacobson et al. | |
| 2011/0161355 | A1 | 6/2011 | Lee et al. | |
| 2012/0136945 | A1* | 5/2012 | Lee | H04L 67/2838 709/206 |
| 2013/0060962 | A1* | 3/2013 | Wang | H04L 67/327 709/238 |
| 2013/0080468 | A1* | 3/2013 | Attanasio | G06F 17/30979 707/769 |

OTHER PUBLICATIONS

Van Jacobson et al.: "Networking Named Content", Context '09 Proceedings of the 5th International Conference on Emerging Networking Experiments and Technologies; Dec. 1-4, 2009; Rome, Italy, Association for Computing Machinery, New York, NY, USA, Dec. 1, 2009 (Dec. 1, 2009), pp. 1-12, XP002608160.

Basu et al.: "International Naming in DTN; draft-pbasu-dtnrg-naming-00.txt", Intentional Naming in DTN; Draft-Pbasu-Dtnrg-Naming-00.Txt, Internet Engineering Task Force, IETF; Standardworkingdraft, Internet Society (ISOC) 4, rue des Falaises CH-1205 Geneva, Switzerland, May 22, 2009 (May 22, 2009), XP015062485.

Lee et al.: "Proxy-Assisted Content Sharing using Content Centric Networking (CNN) for Resource-Limited Mobile Consumer Devices", IEEE Transactions on Consumer Electronics, IEEE Service Center, New York, NY, US, vol. 57, No. 2, May 1, 2011 (May 1, 2011), pp. 477-483, XP011335674.

International Search Report and Written Opinion dated Dec. 19, 2012 for corresponding International Application No. PCT/CN2012/073383, filed Mar. 31, 2012.

* cited by examiner

CONTENT CENTRIC M2M SYSTEM

CROSS-REFERENCE TO RELATED APPLICATIONS

This Application is a Section 371 National Stage Application of International Application No. PCT/IB2013/000706, filed Mar. 29, 2013, and published as WO 2013/144716 on Oct. 3, 2013, in English, which is based on and claims the benefit of International Patent Application No. PCT/CN2012/073383, filed Mar. 31, 2012, the contents of which are incorporated herein by reference in their entireties.

FIELD OF THE DISCLOSURE

The present invention generally relates to communications in a M2M ("Machine to Machine") network.

It finds applications, in particular while not exclusively, in networks built in a content centric way, hereafter called Content Centric Networks CCN.

BACKGROUND OF THE DISCLOSURE

CCN architectures have been disclosed for instance in documents US20090288163, US20090287835 and US20090285209.

In a Content Centric Network, each content delivered in the network has a unique structured name. The nodes of the network declare their interest to some content by sending an Interest packet with the name of the desired content to other nodes of the network. Upon reception of an Interest packet, a first CCN node determines whether the content satisfying the Interest packet is available. If so, the corresponding content is sent to the Interest packet requesting node. Otherwise, the Interest packet is marked as pending in the receiving node and forwarded to a second CCN node in the network based on the Interest. After receiving the content from the second CCN node in response to the forwarded Interest packet, the first CCN node un-marks the Interest packet as pending and sends the content to the Interest packet requesting node.

A CCN node routes a packet based on the action corresponding to the condition as specified in its routing policy.

A CCN node comprises a routing table containing three main structures: a database called FIB (Forwarding Information Base), a buffer memory called ContentStore, and a second database called PIT (Pending Interest Table).

The FIB is used to forward Interest packets toward nodes being potential sources of matching data. The ContentStore is similar as the buffer memory of an IP router. The PIT is used to keep track of Interest packets that have been forwarded upstream toward nodes being content sources so that returned Data packets can be sent downstream to a requesting entity or node.

A user device can ask for content by broadcasting an Interest packet. A node receiving the Interest packet and having data that satisfies it can respond with a Data packet containing data related to the content. Data packet is transmitted only in response to an Interest packet.

The current dominant architectures of M2M system are known as Zigbee, Z-Wave, Wavenis, 6LoWPAN and Web of Things (Constrained Application Protocol CoAP).

ZigBee is a specification for a suite of high level communication protocols using small, low-power digital radios based on the IEEE 802.15.4-2003 standard for Low-Rate Wireless Personal Area Networks (LR-WPANs), such as wireless light switches with lamps, electrical meters with in-home-displays, consumer electronics equipment via short-range radio needing low rates of data transfer.

The protocol stack in ZigBee consists of four main layers: the PHYsical layer (PHY), the Medium Access Control (MAC) layer, the network layer (NWK), and the application layer (APL). In addition, ZigBee provides security functionality across layers. The two lower layers (PHY for physical and MAC for Medium Access Control) of the ZigBee protocol stack are defined by the IEEE 802.15.4 standard, while the rest of the stack is defined by the ZigBee specification.

The ZigBee NWK layer specifically supports addressing and routing for the tree and mesh topologies. Its functionalities involve the address assignment to facilitate multi-hop data delivery. A set of mechanisms based on the ad hoc on-demand distance vector (AODV) routing protocol is used for arbitrary point-to-point traffic.

There are two relevant ZigBee application profiles defined for the operation of APL layer. The first one is the ZigBee Home Automation Public Application Profile, which defines device descriptions, commands, attributes, and other standard practices for ZigBee applications in a residential or light commercial environment. The second one is the ZigBee Smart Energy Profile, which focuses on energy demand response and load management applications. This profile is used for communications between home devices and the energy service portal (ESP) that connects a ZigBee Smart Energy network with the communication network of an energy supply company.

Z-Wave is a wireless protocol architecture promoted by the Z-Wave Alliance for automation in residential and light commercial environments. Its main purpose is to allow reliable transmission of short messages from a control unit to one or more nodes in the network. The protocol stack in Z-Wave is composed of five main layers: the PHY, MAC, transfer, routing, and application layers.

The Z-Wave radio mainly operates in the 900 MHz ISM bands and recently supports the 2.4 GHz band. Its MAC layer defines a collision avoidance mechanism that allows the transmission of a frame when the channel is available. The Z-Wave routing layer performs routing based on a source routing approach. The application layer in Z-Wave offers the dedicated APIs for the application development.

Wavenis is a wireless protocol stack developed by Coronis Systems for control and monitoring applications in several environments, including home and building automation. Wavenis is currently being promoted and managed by the Wavenis Open Standard Alliance (Wavenis-OSA). It defines the functionality of physical, link, and network layers. Wavenis services can be accessed from upper layers through an Application Programming Interface (API).

Wavenis operates mainly in the 433 MHz, 868 MHz, and 915 MHz bands, while some products also operate in the 2.4 GHz band. The Wavenis MAC sublayer offers synchronized and non-synchronized schemes where mixed CSMA/time-division multiple access and CSMA/CA (Carrier Sense Multiple Access/Collision Avoidance) is exploited respectively. The Wavenis logical link control (LLC) sublayer manages flow and error control by offering per-frame or per-window acknowledgments ACKs.

The Wavenis network layer specifies a four-level virtual hierarchical tree. The root of the tree may play the role of a data collection sink or a gateway. A device that joins a Wavenis network intends to find an adequate parent.

An IP-based solution aims at implementing the current TCP/IP protocol stack within low cost sensors, which are nodes of the CCN storing content. Its protocol stack is composed of five layers: physical layer, MAC layer, network layer, transport layer and application layer.

The physical layer and MAC layer are normally built by following IEEE 802.15.4 specification, while the network layer is based on the specifications defined by IETF IPv6 over Low-Power Wireless Personal Access Network (6LoWPAN) Working Group (WG) where the frame format and several mechanisms are devised for the transmission of IPv6 packets on top of IEEE 802.15.4 networks.

At the transport layer and application layer, the Constrained Application Protocol (CoAP) developed by IETF is introduced for the HTTP-based application. To be specific, CoAP easily translates to HTTP for integration with the web while meeting specialized requirements such as multicast support, very low overhead and simplicity for constrained environments. Unlike HTTP, CoAP deals with the REST interchanges asynchronously over a UDP transport with support for both unicast and multicast interactions.

However, the previously introduced existing solutions have drawbacks when used in a CCN context.

Indeed, the Zigbee defines the overall architecture integrating the components from physical layer to application layer, which may cause complicated development and expensive deployment. For instance, the realistic device on the basis of Zigbee normally needs to be equipped with two independent micro-processors one of which is for the Zigbee protocol stack implementation that has been greatly simplified (e.g. Z-stack from Texas Instruments™) and the other is responsible for the data processing oriented to the specific application. Thus, the current Zigbee device is much more complicated and less cheap for the wide usage. On the other hand, the protocol stack of Zigbee is incompatible with existing popular protocol such as TCP/IP which brings the difficulties in developing the Zigbee-based application by following the current process.

The Z-Wave and Wavenis are confronted with the same problems as Zigbee. The private APIs set the great barrier in the development following the TCP/IP principle.

In summary, the non-IP-based solutions such as Zigbee, Z-Wave and Wavenis are organized in the highly integrated way, which limits their usage in different cases. For instance, all of these solutions are unable to support the system communicating with Wi-Fi connections. In other words, these solutions are oriented to the specific physical layer using various radio technologies so that they are unsuitable for the heterogeneous environment where multiple connections based on different transmission technologies (i.e. Wi-Fi or Ethernet) are created for communication between the sensors.

Although the IP-based solution is compatible with the existing TCP/IP network, its network layer built by 6LoW-PAN is only suitable for the IEEE 802.15.4 networks. On the other hand, CoAP may lead to the potential problems in terms of energy consumption, deployment flexibility and traffic load even if it can incorporate with other lower layer protocols such as Wi-Fi.

Specifically, any change in the sensor's IP address may cause a potential fault visit from the outer network because the destination IP address is essential in the communication application developed with the sockets API that is widely used in TCP/IP network. Furthermore, the automatic configuration of IP address defined in 6LoWPAN normally leads to a change in the destination IP address in the case where the sensor is renewed due to the breakdown of the previous one.

The limitation in sensor's capability is generally unmatched with the resource requirement of supporting CoAP and 6LoWPAN together that possibly amounts to relatively larger memory size and higher processing speed in the micro processor. The powerful processing unit in the sensor means a high cost for deployment.

Since the CoAP enables the sensor to act as an HTTP sever that should response to each request from the users, a sensor that provides the data to huge number of users (e.g. an air quality sensor in the public location) has to face the problem that its battery energy may be exhausted quickly due to the hosts of visiting requests from tens of thousands people.

The M2M system built with the IP-based solution can be equivalently considered as a web system with the simpler functionality. Thus, the load balance is the crucial issue for the system operation. Too many visiting requests may block the response from the sensor even if it has no energy constraints because of the sufficient supply.

SUMMARY

To address these needs, a first aspect of the invention relates to a method for routing data at a first node of a network comprising at least a second node. The method comprises:
  providing the first node with a database FIB storing at
    least one association between:
    an URL component identifying a content at the first
      node, and
    a unique identifier associated to the second node, said
      unique identifier being specified by the second node,
  registering a content locally stored in the second node by
    storing in the database FIB an association between an
    URL component identifying the locally stored content
    and the unique identifier of the second node;
and, upon reception from a requesting entity, by the first node, of a content request comprising a content identifier, the method further comprises:
  checking in the database FIB whether the content identifier comprises the URL component,
  and forwarding the content request to the second node if
    the content identifier comprises the URL component
    associated with the unique identifier of the second
    node.

The first node can be any node of a network that comprises routing functionalities. For example, as described later, the first node can be a gateway, a data collector or any routing device. The second node is any node, which can locally store content or a set of contents. For example, the second node can be a sensor, which stores physical measures, or can be a data collector in charge of several sensors. In the latter case, the wording "locally stored" in the data collector is to be understood as "stored in each of the sensors that are covered by the data collector".

The content request can be of several types according to the invention. As explained in what follows, the content request can be an Interest packet or an Interest Subscription packet. The requesting entity can be any entity outside the network that requires access to the content identified by the content identifier. The requesting entity can also be a node of the network, which has previously routed the content request to the first node.

The method according to the invention thus enables to define a new database FIB, which associates an URL component (a fragment of an URL, for example "/room_9/temperature123") identifying a content, with a unique identifier of the second node that stores the content. This enables to route a content request identified at least partly by an URL in a content centric network, and is thus compatible with protocols such as TCP/IP, without being fully dedicated to IEEE 802.15.4 networks as the IP-based solutions presented in the introduction.

According to some embodiments, the first node comprising means for storing data of at least one content, the method further comprises, prior to forwarding the content request to the second node:
 checking whether the requested content is stored by the first node, and
 sending from the first node the requested content to the requesting entity if the requested content is locally stored by the first node.

These embodiments enable to avoid forwarding the content request, when the data of the requested content is already stored in the first node, for example in the Content-Store of the first node.

In some embodiments, the content identifier comprising an identifier of the first node and a current URL identifier, the method comprises:
 checking in the database FIB whether the current URL identifier comprises the URL component associated with the unique identifier of the second node,
 and forwarding the content request to the second node if the current URL identifier comprises the URL component.

Thus, a new mode of coding a content identifier is defined by the present invention. In what follows, this mode is called Compressed Mode II, in which the content identifier comprises a unique identifier (a sequence of bits for example) and a current URL identifier (also called remaining URL component in what follows). Thus, the payload of the content request can be shortened according to the present invention, thus enabling an implementation in a network comprising nodes with restrained resources.

In complement, prior to forwarding the data request to the second node, the unique identifier of the first node is deleted from the content identifier and the current URL identifier is replaced by the unique identifier of the second node in the content identifier.

These embodiments enable to further reduce the length of the payload of the content packet. Thus, from an initial complete URL routable from a web browser for example, the content identifier can progressively be shortened each time it is forwarded upstream in the network, thus reducing the size of the content request.

According to some embodiments, the first node further comprises a second database PIT storing at least identifiers of requesting entities, and if the content request is forwarded to the second node, a second URL component identifying the requested content at the requesting entity is stored in the second database PIT in association with an identifier of the requesting entity, and, upon reception of a data packet comprising at least a part of the requested content from the second node, the method further comprises sending the data packet to the requesting entity which identifier is associated with the second URL component in the second database PIT.

The database PIT enables to route downstream, toward the initial requiring entity, the data packet containing the requested content.

In complement, the requested content is identified, in the data packet transmitted between the first and second nodes, by the unique identifier of the second node.

These embodiments enable to reduce the payload of the data packet in the downstream direction.

Still in complement, wherein the requested content is identified, in the data packet transmitted between the first node and the requesting entity, by the second URL component.

These embodiments enable to ensure that the minimum payload is used to code the content identifier in the data packet.

Alternatively or in complement, the method further comprises, after sending the data packet to the requesting entity, deleting the association in the second database PIT.

Alternatively, the content request being a subscription request, the data packet is received from the first node each time the requested content is updated, the data packet comprising an updated version of the requested content.

These embodiments enable to define a new packet type, which avoids requesting several contents by transmitting several content requests. Indeed, a single content request enables to receive, at the requesting entity, several data packets containing updated contents.

According to some embodiments, the requested content being dynamically updated, the content request comprises a command for sending the content if the updated content fulfils a predetermined criterion, and the data packet is sent from the second node if the criterion is fulfilled by the updated requested content.

These embodiments enable to define commands in the content request. The criterion can for example be a threshold. When the second node detects that a physical measure is greater than the threshold, a data packet can be sent downstream to the requesting entity.

In some embodiments, the first node is a data collector, the second node is a sensor and the sender of the content request is a gateway accessible by a user via a web browser. Alternatively, the first node is a gateway accessible by a user via a web browser, the second node is a sensor and the requesting entity is the web browser of the user. According to another alternative, the first node is a gateway accessible by a user via a web browser, the second node is a data collector connected to at least one sensor storing the locally stored content, and the requesting entity is the web browser of the user.

The method according to the invention can thus be implemented in any network topology.

A second aspect of the invention concerns a computer program product recorded on a storage medium and executable by a computer in the form of a software agent including at least one software module setup to implement the method according to the first aspect of the invention.

A third aspect of the invention relates to a routing device for routing data in a network comprising at least one node. The routing device comprises:
 a database FIB storing at least one association between:
  an URL component identifying a content at the routing device, and
  a unique identifier associated to the node, said unique identifier being specified by the node,
 means for registering a content locally stored in the node by storing in the database FIB an association between an URL component identifying the locally stored content and the unique identifier of the node;
 means for receiving, from a requesting entity, a content request comprising a content identifier,
 means for checking in the database FIB whether the content identifier comprises the URL component, and
 means for forwarding the content request to the node if the content identifier comprises the URL component associated with the unique identifier of the node.

A fourth aspect of the invention concerns a network for routing data comprising at least a first node and a second node. The first node comprises:
- a database FIB storing at least one association between:
  - an URL component identifying a content at the first node, and
  - a unique identifier associated to the second node, said unique identifier being specified by the second node,
- means for registering a content locally stored in the second node by storing in the database FIB an association between an URL component identifying the locally stored content and the unique identifier of the second node;
- means for receiving, from a requesting entity, a content request comprising a content identifier,
- means for checking in the database FIB whether the content identifier comprises the URL component, and
- means for forwarding the content request to the node if the content identifier comprises the URL component associated with the unique identifier of the second node.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF ILLUSTRATIVE EMBODIMENTS

Figure 1:
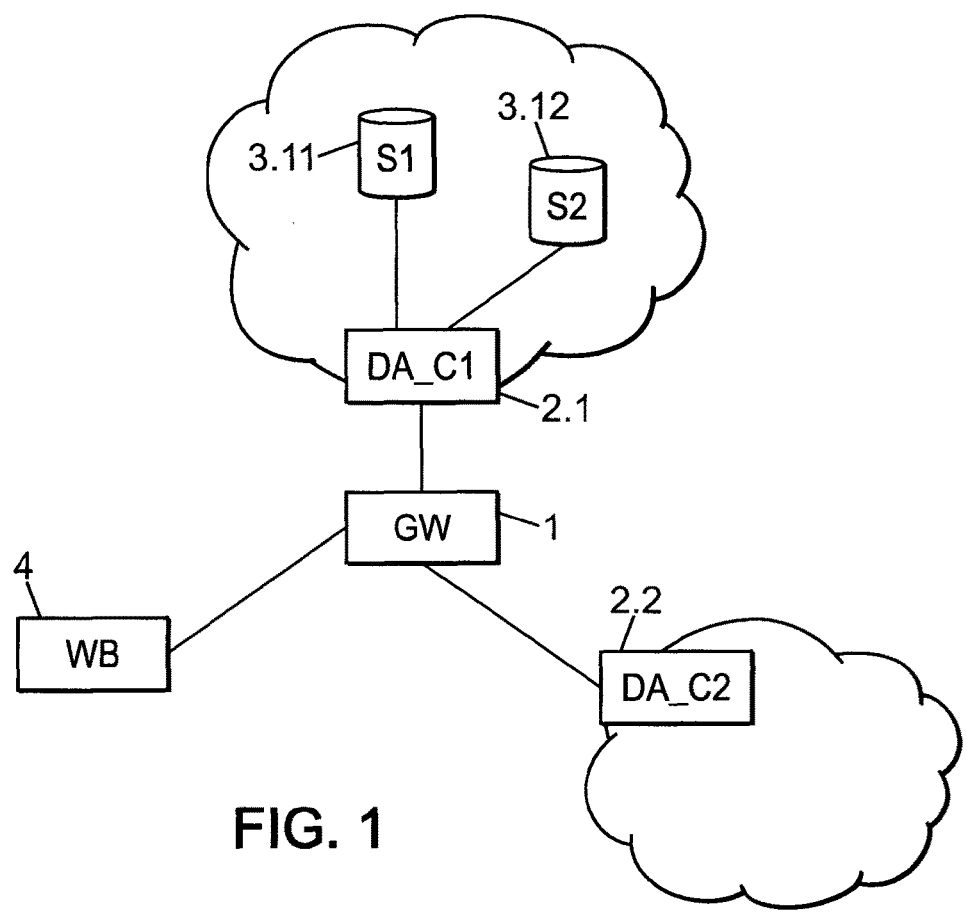
FIG. 1 represents a content centric network for routing data according to some embodiments of the invention.

Referring to FIG. 1, there is shown a content centric network for routing data according to some embodiments of the invention.

The network comprises a gateway 1, which is arranged to communicate with a first data collector 2.1, at least a second data collector 2.2 and a web browser 4 from a user terminal. The gateway 1 is arranged to receive Interest packets (and more generally a content request, which includes other types of packets, as described hereafter) from the browser 4 and to route it to one of the data collectors to which the gateway 1 is connected.

The first data collector 2.1 is for example connected to at least a first sensor 3.11 and a second sensor 3.12. No restriction is attached to the type of sensor that is considered. For example, a sensor can be a thermometer, an accelerometer, a device measuring a gas concentration in a room, etc.

The invention is not restricted to the architecture of the content centric network represented on FIG. 1. For example, the gateway 1 can be directly connected to a plurality of sensors 3.11-3.12 so that packets do not transit through the data collectors 2.1 and 2.2.

The gateway 1, the data collectors 2.1 and 2.2 and the sensors 3.11 and 3.12, are considered as nodes of the network.

Figure 2:
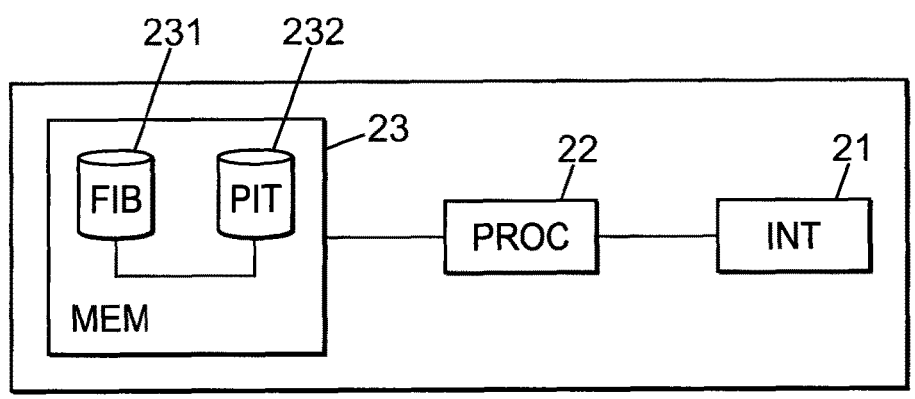
FIG. 2 illustrates a routing device, also called a first node, according to some embodiments of the invention.

Referring to FIG. 2, there is shown a first node 20, being a routing device, according to some embodiments of the invention. For example, the first node can be the gateway 2.1 or one of the data collectors 2.1 and 2.2.

The first node 20 comprises an interface 21, which is arranged to exchange packets (content request such as Interest packets, or Data packets, Content Registration requests, etc) with other nodes of the network or with the web browser 4.

The first node 20 further comprises a processing unit 22 arranged to handle the packets received from the interface 21 based on a memory 23 including a database FIB 231, a database PIT 232 and a ContentStore (not represented on FIG. 2).

The steps performed by the processing unit 22 of the first node will be described hereafter, referring to FIGS. 6, 7 and 8.

The protocol architecture according to the invention is composed of four layers comprising a physical (PHY) layer, a Medium Access Control (MAC) layer, a Network layer and a Content Layer (listed from the lower layers to the upper layers). However, in some embodiments the network layer is optional, as explained hereafter.

According to the invention, the two lower layers (PHY and MAC layers) can be built in a constraint environment or in a normal environment.

In the constraint environment (when at least some of the nodes of the networks have restrained resources), the two lower layers according to the invention may inherit existing standards such as IEEE 802.15.4, IEEE 802.11, etc. The network layer can be organized with the Routing Protocol for Low power and lossy networks (RPL) developed by the IETF Routing Over Low power and Lossy Networks (ROLL). Alternatively, the network layer can be removed from the stack, which means the nodes of the network communicate with each other via the MAC layer (for example IEEE 802.15.4).

When using the network layer for routing communications between nodes of the network, two schemes can be envisaged: mesh under and route over.

According to the mesh under routing, routing is performed below the network layer (IP layer) using IEEE 802.15.4 addresses (MAC addresses). According to the route over routing, routing occurs at the IP layer and every radio hop is equivalent to an IP hop.

According to the invention, the Content layer can operate either with a mesh under routing or with a route over routing. According to the mesh under routing, the Content layer has a direct interface with the MAC layer and MAC addresses can be used for communications between nodes whereas in the case of the route over routing, IP addresses are used to facilitate the operations in the Content layer.

The Content layer in the architecture deals with service requirements from the users. As previously explained, in a CCN approach, two types of packets are routed in the network: Interest and Data packets. The present invention also defines new types of packets, as described in what follows.

In order to enable compatibility with current existing networks, packets in the Content layer can be encrypted as UDP (User Datagram Protocol) packets in the normal environment. In this case, the Content layer can be equivalently regarded as one UDP session from the perspective of the traditional TCP/IP network.

In the constrained environment, the content layer is built as an independent component of the protocol stack where the packets can be directly processed without the need of being encrypted as UDP packets.

Figure 3A:
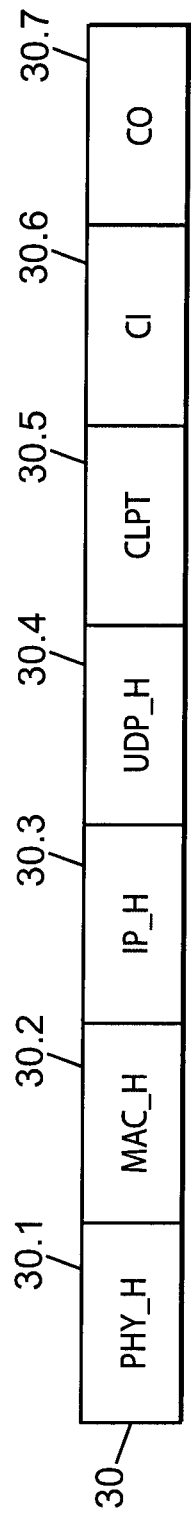
FIGS. 3.*a* to 3.*c* illustrates three packet formats according to some embodiments of the invention.
Figure 3B:
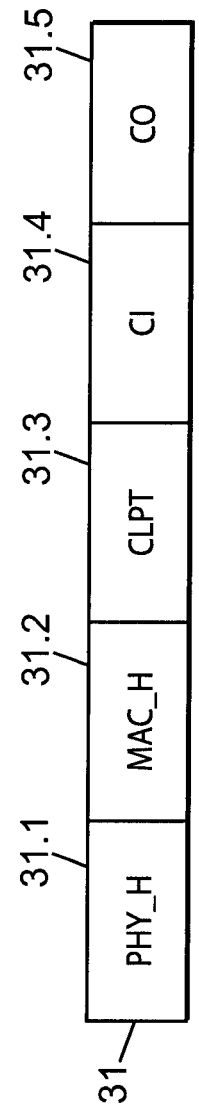
Figure 3C:
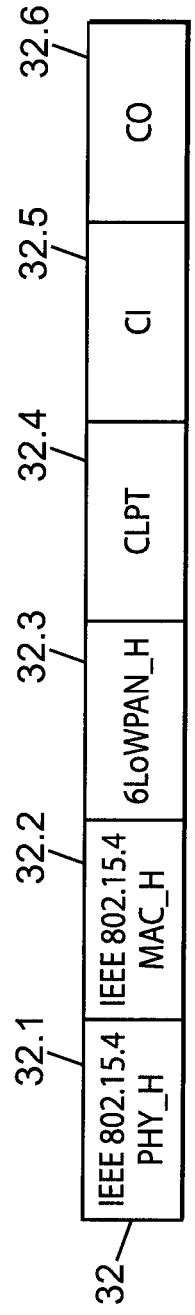

Referring to FIG. 3.a, there is shown a packet format 30 in a general case, according to some embodiments of the invention.

In this general case dedicated to an IP based network, the packet format 30 comprises a PHY header 30.1, a MAC header 30.2, an IP header 30.3 (Network layer). The PHY header 30.1 and the MAC header 30.2 can follow the specifications such as IEEE 802.15.4, IEEE 802.11 or IEEE 802.3. The IP header 30.3 can be defined with IPv4 or IPv6 protocol for example.

The packet format 30 further comprises a UDP header 30.4 (Content layer), a Content Layer Packet Type field 30.5, a Content Identifier field 30.6 and a Content Object field 30.7.

The Content Layer Packet Type 30.5 can be a field of one byte indicating packet types to be recognized in the Content layer.

Several types of packets are defined according to the invention. It is to be noted that the type of packet defines the nature of the packet and also a mode used to code a content identifier in the Content Identifier field 30.6 (URL mode, Compressed Mode I and Compressed Mode II, which are described in what follows).

A first group of packet types comprises:
Interest in URL mode, which can be coded in the Content Layer Packet Type field 30.5 as "0x01";
Interest in Compressed Mode I, which can be coded in the Content Layer Packet Type field 30.5 as "0x02";
Interest in Compressed Mode II, which can be coded in the Content Layer Packet Type field 30.5 as "0x03";
Interest Subscription in URL mode, which can be coded in the Content Layer Packet Type field 30.5 as "0x04";
Interest Subscription in Compressed Mode I, which can be coded in the Content Layer Packet Type field 30.5 as "0x05";
Interest Subscription in Compressed Mode II, which can be coded in the Content Layer Packet Type field 30.5 as "0x06";
Interest Cancellation in URL mode, which can be coded in the Content Layer Packet Type field 30.5 as "0x07";
Interest Cancellation in Compressed Mode I, which can be coded in the Content Layer Packet Type field 30.5 as "0x08";
Interest Cancellation in Compressed Mode II, which can be coded in the Content Layer Packet Type field 30.5 as "0x09".

Typically, the packets of the packet types belonging to the first group are initially transmitted by a browser dedicated to users, in order to require a given content (for example the browser 4). The Interest packet type has been previously introduced and is used by a user to require content in the network. The Interest Subscription packet type and Interest Cancellation packet type are newly introduced according to the invention, and will be described in what follows.

Packets of the first group are also called content requests according to the invention.

A second group of packet types comprises:
Data in URL mode, which can be coded in the Content Layer Packet Type field 30.5 as "0x0A";
Data in Compressed Mode I, which can be coded in the Content Layer Packet Type field 30.5 as "0x0B";
Data in Compressed Mode II, which can be coded in the Content Layer Packet Type field 30.5 as "0x0C".

A third group of packet types is related to content registration and comprises:
Content Registration, which can be coded in the Content Layer Packet Type field 30.5 as "0x0D";
Content Registration ACK, which can be coded in the Content Layer Packet Type field 30.5 as "0x0E";
Content Registration Confirmation, which can be coded in the Content Layer Packet Type field 30.5 as "0x0F".

In addition, a packet type called Content State Update can be coded in the Content Layer Packet Type field 30.5 as 0x10.

The Content Identifier field 30.6 is defined similarly to the CCN approach, but is coded according to different modes defined by the invention.

The Content Object field 30.7 comprises the data bytes constituting the content.

The Content Identifier field 30.6 is never empty, while the Content Object field 30.7 may be empty.

The format of the packet 30 has been defined for an IP based network.

However, the packet format can be adapted to non-IP based networks, and FIG. 3.b illustrates a packet format 31 in a non-IP based network according to some embodiments of the invention.

The packet format 31 comprises a PHY header 31.1, a MAC header 31.2, a Content Layer Packet Type field 31.3, a Content Identifier field 31.4 and a Content Object field 31.5. Thus, compared to the packet format 30, only the IP header 30.3 and the UDP header 30.4 have been removed. Thus, a packet in the packet format 31 is identified in the CCN only based on the content identifier comprised in the Content Identifier field 31.4.

A third packet format can be defined in constrained environments according to the invention. To this purpose, FIG. 3.c represents a packet format 32 in a constrained environment according to some embodiments of the invention.

The packet format 32 comprises a PHY header 32.1 according to IEEE 802.15.4, a MAC header 32.2 according to IEEE 802.15.4, a 6LoWPAN header 32.3. The packet format 32 further comprises a Content Layer Packet Type field 32.4, a Content Identifier field 32.5 and a Content Object field 32.6, these fields being defined as previously explained for packet format 30.

The packet header definition defined in the 6LoWPOAN protocol can be reused to enable the compatibility of the system according to the invention with the existing 6LoWPAN networks. In particular, in 6LoWPAN header 32.3, the LoWPAN IPv6 addressing header, the LoWPAN mesh header and Fragmentation header can be used.

The LoWPAN mesh header can be used in a network using a mesh under routing, whereas the LoWPAN IPv6 addressing header can be used in a network using a route over routing.

Figure 4A:
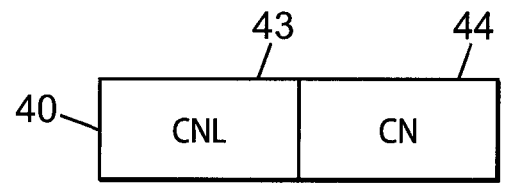
FIGS. 4.*a* to 4.*c* represents three content identifier structures according to some embodiments of the invention.
Figure 4B:
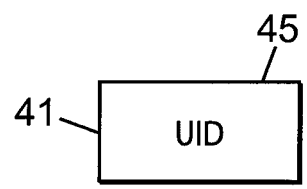
Figure 4C:
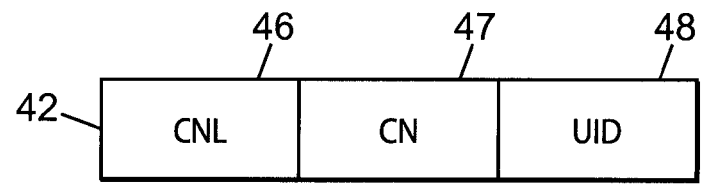

Referring back to the modes for coding the content identifier contained in the Content Identifier field 30.6, 31.4 or 32.5, FIGS. 4.a to 4.c respectively illustrate content identifier structures 40, 41 and 42 according to an URL mode, a Compressed Mode I and a Compressed Mode II.

FIG. 4.*a* represents a content identifier structure 40 according to the URL mode. The content identifier structure comprises a Content Name Length field 43 and a Content Name field 44. The Content Name Length field 43 indicates the length of an URL contained in the Content Name field 44. The URL contained in the Content Name field can be a complete URL originating from the browser 4 of the user or can be a component (a portion) of the complete URL originating from the browser 4, as explained in what follows. For example, a complete URL can be, for example, "Orange.com/Office/room_9/gas/CO2", and can refer to a content being a concentration of CO2 in room 9 of a given office of Orange for example. A component of the complete URL can be "koom_9/gas/CO2" or "/gas/CO2", for example.

For example, a maximum allowable length of the URL or URL component contained in the Content Name field 44 can be 100 bytes.

FIG. 4.*b* represents a content identifier structure 41 according to the Compressed Mode I. The content identifier structure 41 comprises a single Unique Identifier field 45, which can comprise an unsigned integer from 0 to $2^{16}-1$, coded with 2 bytes, and which represents a unique identifier of the node storing a content (the second node), as explained in what follows. Such a unique identifier is not a globally addressable identifier and is used by a first node having previously registered a second node locally storing the content, according to embodiments of the invention. In this case, the unique identifier corresponds to the second node, locally storing a content, and can be registered in the first node in association with an URL component identifying the content at the first node. For example, the unique identifier can be "0x009A", and the URL component associated with the unique identifier in the first node can be "Orange.com/Office/room_9". The content registration steps will be further detailed with reference to FIGS. 5, 6 and 9.

FIG. 4.*c* represents a content identifier structure 42 according to the Compressed Mode II. The content identifier structure 42 comprises a Content Name Length field 46, similar to the field 43 of structure 40, a Content Name field 47, similar to the field 44 of structure 40, and a Unique Identifier field 48, similar to the field 45 of structure 41.

Thus, the Compressed Mode II enables a concatenation of the unique identifier of a second node and a URL-like string. Thus, the complete URL "Orange.com/Office/room_9/gas/CO2" can be expressed as "0x009A" (unique identifier of the room 9) plus "/gas/CO2" (URL component identifying the content in a routing device of room 9), which is the remaining component (or "current URL component") of the complete URL, when "Orange.com/Office/room_9" has been replaced by the associated "0x009A".

The Compressed Mode II can be particularly useful, for example when the first node is the gateway 1, which is in charge of routing a content request (for example an Interest packet) in the network, and the second node is the data collector 2.1, for example in charge of collecting data in room 9 of the Office of Orange. The data collector 2.1 can thus be registered in the gateway 1 by storing the unique identifier of the data collector "0x009A" in association with the URL component "Orange.com/Office/room_9" identifying all the contents stored in room 9. Indeed, replacing, in the gateway 1, the complete URL "Orange.com/Office/room_9/gas/CO2" by the content identifier "0x009A/GAS/CO2", in the Content Identifier field 30.5, 31.4 or 32.5 of the Interest packet enables to reduce the payload size occupied by the content identifier.

Figure 5:
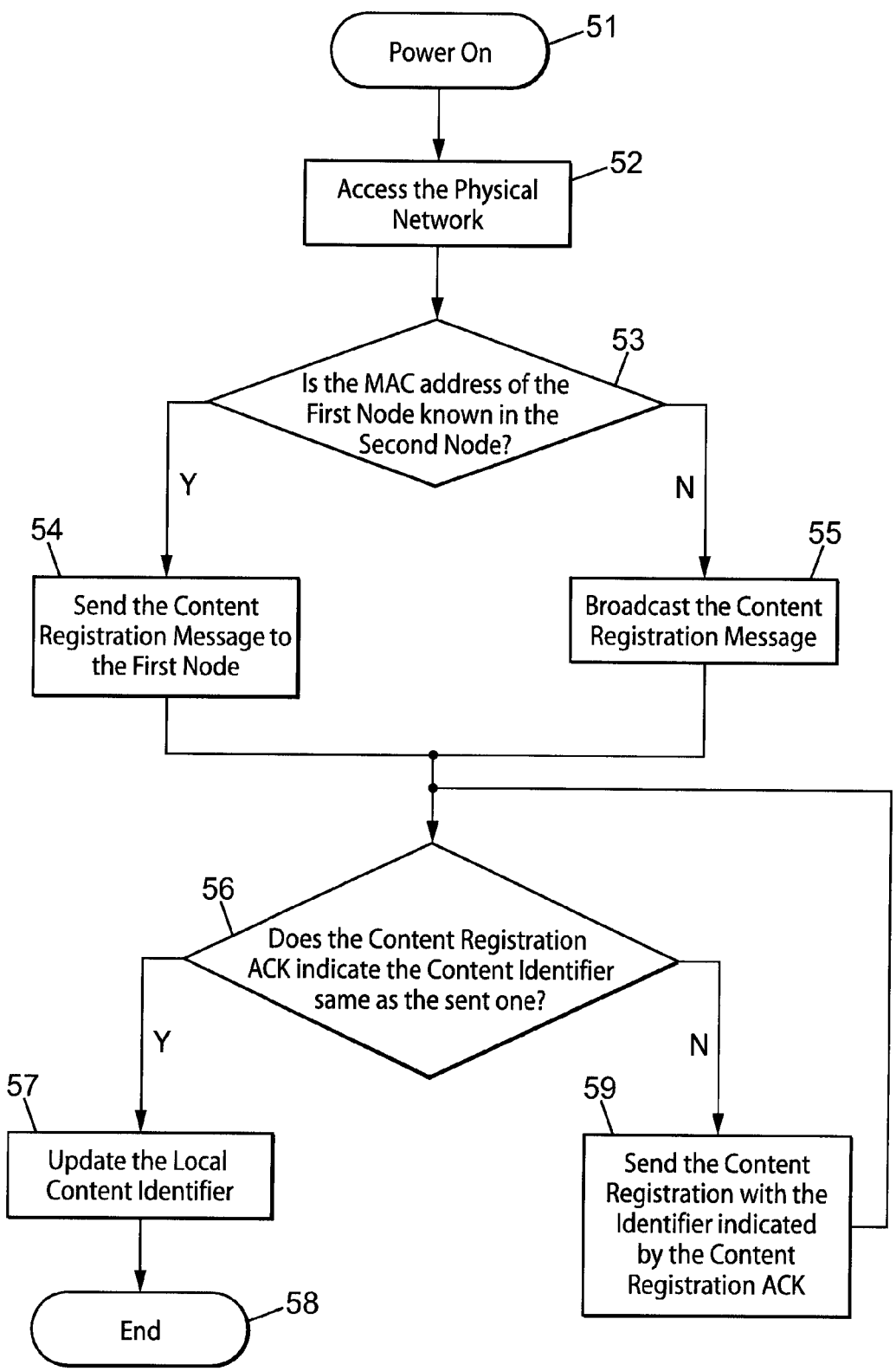
FIG. 5 is a flowchart representing steps of a content registration from a second node side, according to some embodiments of the invention.

FIG. 5 represents the main steps of a content registration from the second node side according to some embodiments of the invention.

A content registration is performed by using the packet types defined in the third group previously introduced. The packets are exchanged between a first node and a second node, to register a content or several contents locally stored at the second node, in the first node. According to the invention, the first node (such as the first node 20 described in reference to FIG. 2) can be the gateway 1 or the data collector 2.1. If the gateway 1 is the first node, then the second node can be the data collector 2.1 or one of the sensors 3.11 and 3.12, depending on the topology of the network. If the data collector 2.1 is the first node, then the second node is one of the sensors 3.11 and 3.12. No restriction is attached to the definitions of first node and second node, as they depend on the topology of the considered network. In a general case, the first node according to the invention can be any device in charge of routing packets in the network and the second node is any device arranged to locally store content (sensors 3.11 and 3.12 for example) or to be in charge of a set of sensors (data collector 2.1 for example).

To describe the steps of FIG. 5, it is considered, for the sake of illustration, that the first node is the data collector 2.1 and that the second node is the sensor 3.11. However, the same steps can be applied for the registration of the content locally stored in the data collector 2.1, in the gateway 1 or for the registration of the content locally stored in the sensor 3.11, directly in the gateway 1.

At step 51, the sensor 3.11 is powered on.

At step 52, the sensor 3.11 accesses a content centric network, such as the network illustrated on FIG. 1 for example.

At step 53, the sensor 3.11 checks whether the MAC address of the data collector 2.1, in charge of routing packets to and from the sensor 3.11, is known by the sensor 3.11.

If the MAC address of the data collector 2.1 is known by the sensor 3.11, the sensor 3.11 can send, at step 54, a content registration packet, which can be the Content Registration of the third group of packet types, which has been previously introduced. The content registration packet can have any of the packet formats 30, 31 or 32, which have been previously described. The content registration packet comprises, in the Content Identifier field 30.6, 31.4, or 32.5, an URL content name field (such as the field 47), referring to a preferred URL content name chosen by the sensor 3.11. For instance, the sensor 3.11 being a temperature sensor, the URL content name, which is an URL component identifying the content locally stored on the sensor 3.11, can be set to "/temperature". In addition, the Content Identifier field 30.6, 31.4 or 32.5, comprises a Unique Identifier field, such as field 48 previously described, which enables to identify the sensor 3.11. The unique identifier of the sensor 3.11 can be "0x0093" for example.

If the MAC address of the data collector 2.1 is known by the sensor 3.11, the sensor 3.11 can broadcast in the content centric network, at step 55, a content registration packet, similar to the content registration packet sent at step 54.

Upon reception, at step 56, of a content registration acknowledgment packet, such as the Content Registration ACK packet previously introduced, which also contains an URL content name field and a Unique Identifier field, the sensor 3.11 checks whether the content identifier contained in the Content Identifier field 30.6, 31.4 or 32.5, is the same as the sent one, and in particular, checks whether the URL component "/temperature" is also comprised in the URL content name field of the Content Registration ACK packet.

If the content identifier is the same in the Content Registration packet and in the Content Registration ACK packet, then the sensor 3.11 updates at step 57 a local identifier, by locally storing the URL component "/temperature" in association with the unique identifier "0x0093". Then at step 58, the content registration ends by sending, by the sensor 3.11, a confirmation packet to the data collector 2.1. The confirmation packet can be the Content Registration Confirmation packet, which has been previously introduced. The confirmation packet also comprises an URL content name field containing "/temperature" and a Unique Identifier field containing "0x0093". It is to be noted that step 57 is optional.

If the content identifier is not the same in the Content Registration packet and in the Content Registration ACK packet, for example if the URL component in the URL content name field of the Content Registration ACK packet is "/temperature123", then the sensor 3.11 resends at step 59 a new Content Registration packet to the data collector 2.1, the new Content Registration packet comprising "/temperature123" in the URL content name field. Step 56 is then iterated.

In alternative embodiments, at step 59, the sensor 3.11 updates the local identifier, by storing the URL component "/temperature123" in association with the unique identifier "0x0093", and sends a confirmation packet comprising an URL content name field containing "/temperature123" and a Unique Identifier field containing "0x0093".

Figure 6:
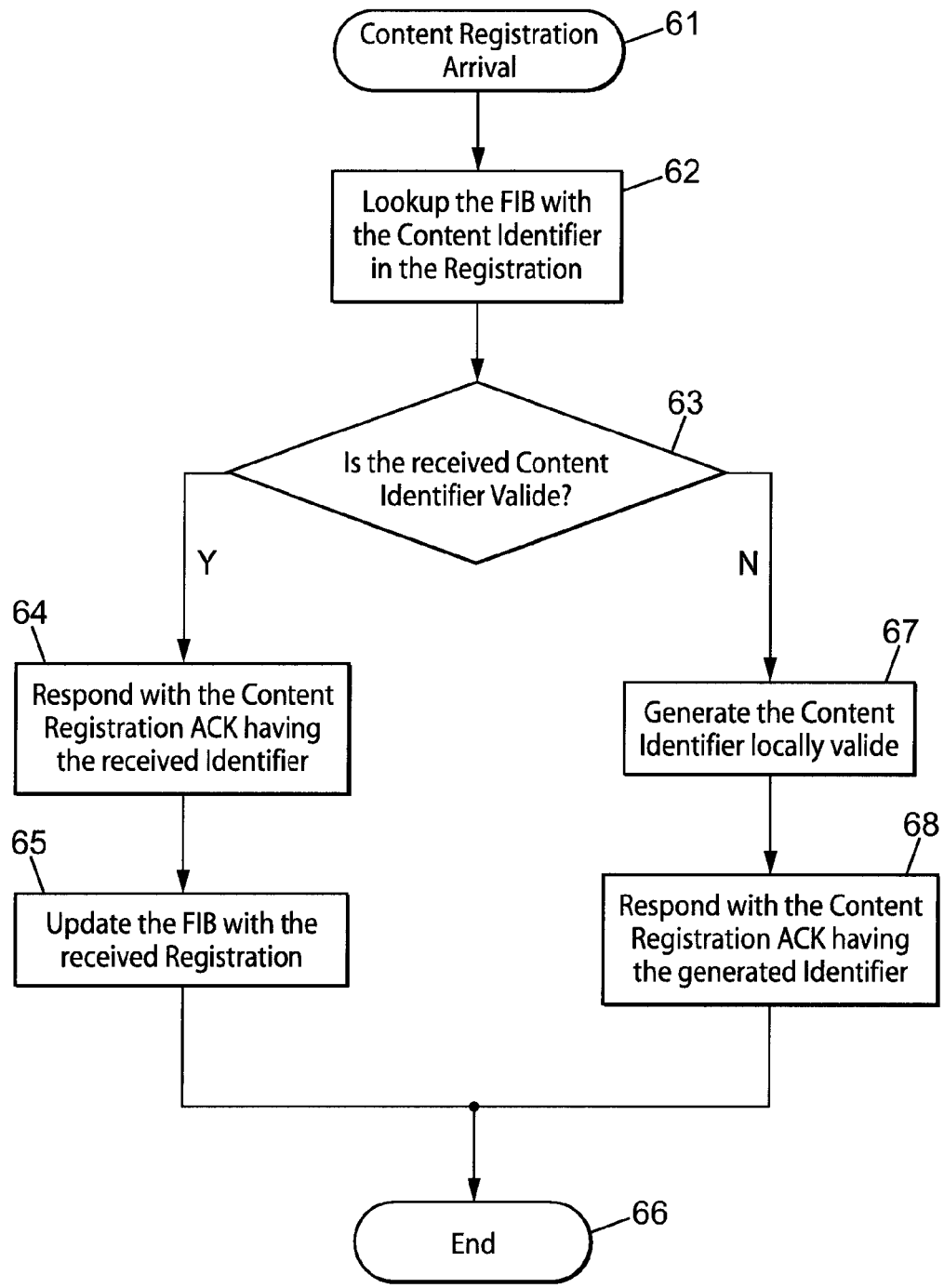
FIG. 6 is a flowchart representing steps of a content registration from a first node side, according to some embodiments of the invention.

FIG. 6 represents the main steps of a content registration from the first node side according to some embodiments of the invention.

In what follows, the same example as the example used for describing FIG. 5 is used.

At step 61, the data collector 2.1 receives the Content Registration packet sent by the sensor 3.11 at step 54 or 55.

At step 63, the data collector 2.1 looks for, in its database FIB, the URL component "/temperature" comprised in the URL content name field of the received Content Registration packet.

At step 63, the data collector 2.1 checks whether the URL component "/temperature" is valid, meaning that the URL component "/temperature" is not already associated with the unique identifier of another node stored in the database FIB.

If the URL component "/temperature" is valid, then the data collector 2.1 sends, at step 64, a Content Registration ACK packet containing the same content identifier as the Content Registration packet (the URL component "/temperature" and the unique identifier "0x0093").

Then at step 65, the data collector 2.1 updates its database FIB by storing an association between the URL component "/temperature" and the unique identifier "0x0093" of the sensor 3.11. According to some embodiments, the updating of the database FIB is only performed upon reception of a confirmation packet, from the sensor 3.11, the confirmation packet comprising the URL component "/temperature" and the unique identifier "0x0093".

The content registration then ends at step 66.

If the URL component "/temperature" is not valid, then the data collector 2.1 generates at step 67 a valid URL component, which is not associated with any unique identifier in the database FIB. For example, the data collector 2.1 can generate the URL component "/temperature123".

At step 68, the data collector 2.1 sends a Content Registration ACK packet containing the valid URL component "/temperature123" and the unique identifier "0x0093", to the sensor 3.11. The data collector 2.1 can then wait for another Content Registration packet to be received from the sensor 3.11.

The content registration then ends at step 66.

In alternative embodiments, after step 68, the data collector 2.1 may activate a timer and wait for a confirmation packet to be received from the sensor 3.11, the confirmation packet comprising the valid URL component "/temperature123" and the unique identifier "0x0093". If such confirmation packet is received before the timer is expired, then the database FIB can be updated by storing in association the URL component "/temperature123" and the unique identifier "0x0093". Else, the database FIB is not updated and the content registration ends at step 66.

Figure 7:
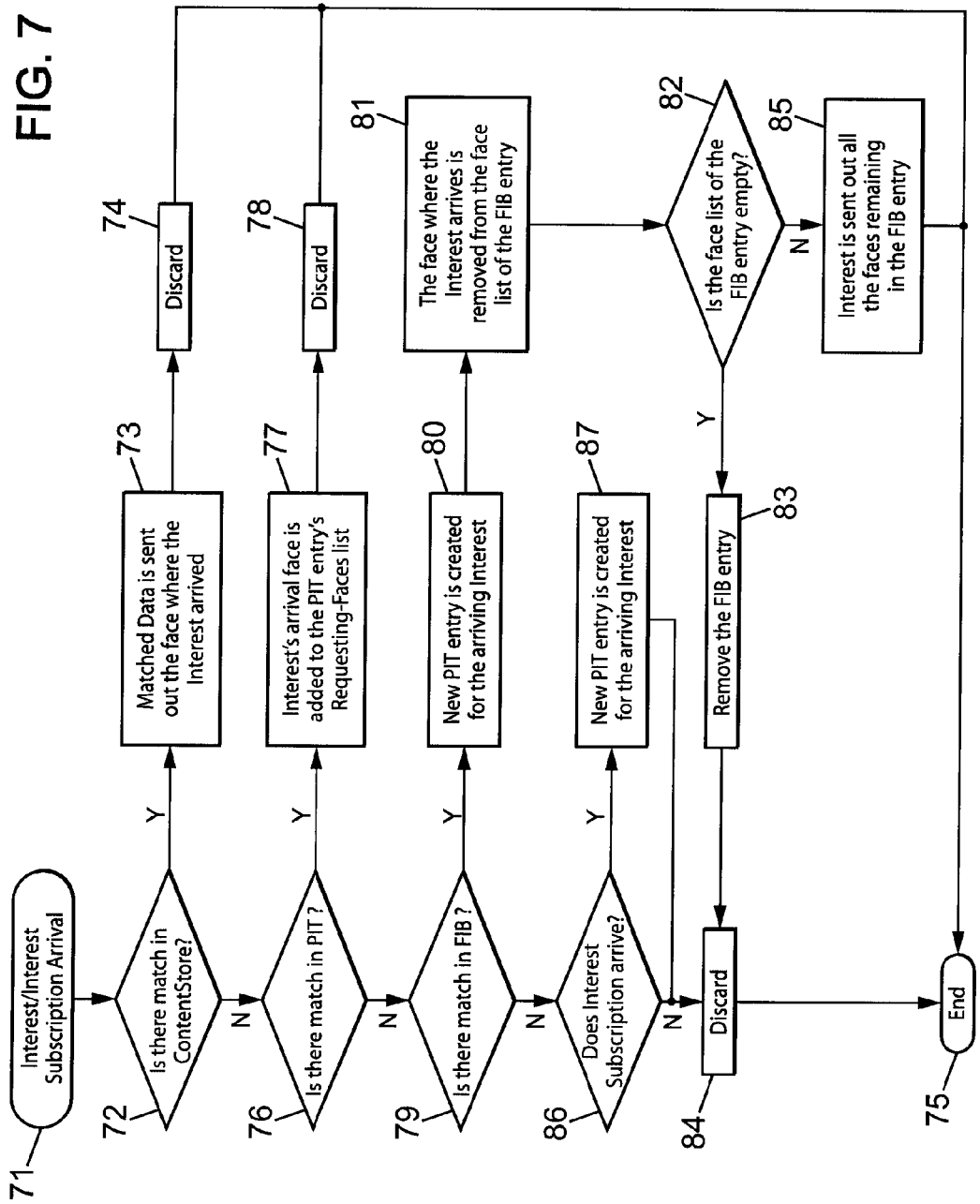
FIG. 7 is a flowchart representing steps of a content request routing at a first node according to some embodiments of the invention.

FIG. 7 represents the main steps of the routing by a first node of a content request, according to some embodiments of the invention.

In what follows, the same example as the examples used for describing FIGS. 5 and 6 is used. The first node is therefore the data collector 2.1 and the second node is the sensor 3.11. A content request can be an Interest packet or an Interest Subscription packet, as previously explained.

At step 71, the data collector 2.1 receives a content request from a requesting entity (in this case, the gateway 1). The content request comprises a content identifier in the Content Identifier field 30.6, 31.4 or 32.5, the content identifier identifying a content requested by the gateway 1. For example, the content identifier can comprise a unique identifier "0x0039" and a URL component "/temperature123", so that the content identifier is "0x0039/temperature123". The unique identifier "0x0039" is, in this example, the unique identifier of the data collector 2.1, which has been previously registered in the gateway 1, for example in association with the URL component "/room_9". Thus, an initial content request received by the gateway 1 may comprise the URL component "/room_9/temperature123" and the subpart "room_9" has been replaced by "0x0039" in the gateway 1 before forwarding the content request to the data collector 2.1.

At step 72, the data collector 2.1 checks whether the requested content identified by the content identifier is already stored in the ContentStore of the data collector 2.1.

If the requested content is already stored in the ContentStore (for example in the case where the same content has been previously requested by the gateway 1), a Data packet comprising the requested content in the Content Object field 30.7, 31.5 or 32.6, is sent by the data collector 2.1 at step 73 to the requesting entity (gateway 1). The content request received at step 71 is then discarded by the data collector 2.1 at step 74 and the routing of the content request ends at step 75.

If the requested content is not stored in the ContentStore of the data collector 2.1, the data collector 2.1 checks in the database PIT, whether the content has already been requested by another requesting entity. For this purpose, the data collector 2.1 checks whether the URL component "/temperature123" is associated with a requesting entity in the database PIT.

If the content identified by the URL component "/temperature123" has already been requested (meaning that a content request has been forwarded to the sensor 2.1) and if the corresponding content request is pending, the data collector 2.1 adds the gateway 1 to the list of requesting entities in the database PIT, the list being associated with the URL component "/temperature123". The data collector 2.1 then discards at step 78 the content request received at step 71.

If the content request requesting the content identified by the URL component "/temperature123" is not pending, then the data collector 2.1 checks at step 79 whether the content identifier comprised in the Content Identifier field 30.3, 31.4 or 32.5 of the content request, comprises the URL component associated with the unique identifier of a registered second node in the database FIB.

If the content identifier comprises an URL component of the database FIB, then the data collector 2.1 creates a new entry at step 80 in the database PIT by associating the URL component "/temperature123" with an identifier of the requesting entity (the gateway 1). Then, at step 81, if the requesting entity is associated with the URL component "/temperature123" in the database FIB, then the association is removed from the database FIB. This enables to update the database FIB when a node, which locally stores a given content and which is therefore associated in the database FIB in association with the given content, is requesting the same given content. Indeed, the content request means that this node does not locally store the content anymore. It is to be noted that step 81 is optional.

At step 82, the data collector 2.1 checks whether there is at least one unique identifier of one node that is associated with the URL component "/temperature123" in the database FIB.

If no unique identifier is stored in association with the URL component "/temperature123" in the database FIB, then the entry of the database comprising the URL component "/temperature123", associated with nothing, is removed at step 83 from the database FIB of the data collector 2.1. The data collector 2.1 then discards at step 84 the content request received at step 71.

If at least one unique identifier of at least one node is stored in association with the URL component "/temperature123" in the database FIB, then the data collector 2.1 forwards, at step 85, the content request to each node which unique identifier is associated with the URL component "/temperature123". In the present example, the data collector 2.1 forwards the content request to the sensor 3.11 which has been previously registered in association with the URL component "/temperature123". When forwarding the content request, the data collector 2.1 can modify the content identifier contained in the Content Identifier field 30.6, 31.4 or 32.5. Indeed, the data collector 2.1 can replace the content identifier "0x0039/temperature123" by the unique identifier "0x0093" of the sensor 2.1. This enables to reduce the payload in the content request, which is advantageous, particularly when the nodes of the system (data collector and sensors, notably) have restrained resources. However, in some embodiments, the content identifier of the content request is not modified, which enables to accelerate the forwarding of the content request.

The routing of the content request ends at step 75.

After step 79, if the content identifier of the content request does not comprise any URL component of the database FIB, the data collector 2.1 checks at step 86 whether the content request is an Interest Subscription packet. If the content request is an Interest Subscription packet and if the content identifier of the packet is either "0x0039" (unique identifier of the data collector 2.1) or an URL component corresponding to the data collector 2.1, then the data collector 2.1 creates a new entry in the database PIT by associating an identifier of the requesting entity with the content identifier contained in the Interest Subscription packet. The Interest Subscription packet, according to the invention, enables to create an entry in the database PIT with respect to a collection of contents. According to the invention, a database PIT entry created by an Interest packet is differentiated from a database PIT entry created by an Interest Subscription entry. For example, the content identifiers "/room_9" or "0x0039" of an Interest Subscription packet can represent all the contents collected in room 9, which are collected by the data collector 2.1. The contents can correspond to contents locally stored on sensor 3.11 or on sensor 3.12. This enables the requesting entity to receive up-to-date content registered by the sensors 3.11 and 3.12 or by other sensors to be registered in the data collector 2.1 and which are in room 9. Thus, by requesting the content identified by "room_9" or "0x0039", the gateway 1 can receive all the contents collected by the data collector 2.1, without needing to transmit an Interest packet to require each one of these contents.

The data collector 2.1 then discards at step 84 the content request, which has been received at step 71.

It is to be noted that, according to the invention, a database PIT entry dedicated to an Interest Subscription is, by default, permanently stored in the database PIT. However, an Interest Cancellation packet, as previously introduced, can be received by the data collector 2.1 to remove the database PIT entry created by the Interest Subscription packet. The entry is removed when the content identifier contained in the Interest Cancellation packet is the same as the content identifiers "/room_9" or "0x0039" of the Interest Subscription packet. In complement a Content State Update packet, previously introduced, can be received by the data collector 2.1. The Content State Update packet enables to update the existence of the content registered in the gateway 1. This enables to ensure the existence of a database FIB in the gateway 1 that may delete said entry due to an absence of update lasting a predefined duration.

In addition, according to the invention, content requests, and in particular Interest packets, can be adapted to define commands defining a given criterion. For example, the symbol "?" can be introduced in the content identifier of some content requests to indicate a start of the command. Furthermore, more than one command can be included in the content identifier, each command being separated from another command by the symbol "&". For instance, the command altering an alarm threshold (the criterion) of a temperature sensor, such as sensor 3.11, may be denoted as "0x0039/temperature123?threshold=70&units=Cels", which means that the sensor 3.11 is required to alarm upon detecting that a temperature above 70° C.

Thus, the methods set utilized in CoAP protocol for content acquisition is simplified according to the invention. Such simplification reduces the complexity of the content identifier processing, which is known as the URL processing in the CoAP protocol. In addition, the present invention offers a great flexibility in the application development over the sensors. A developer can freely define a set of commands for the execution in the sensors built by the largely diverse hardware platforms. In order to spare the resources employed in the network, the content identifier can be denoted with the Compress Mode I or Compress Mode II, depending on the network configuration.

Figure 9:
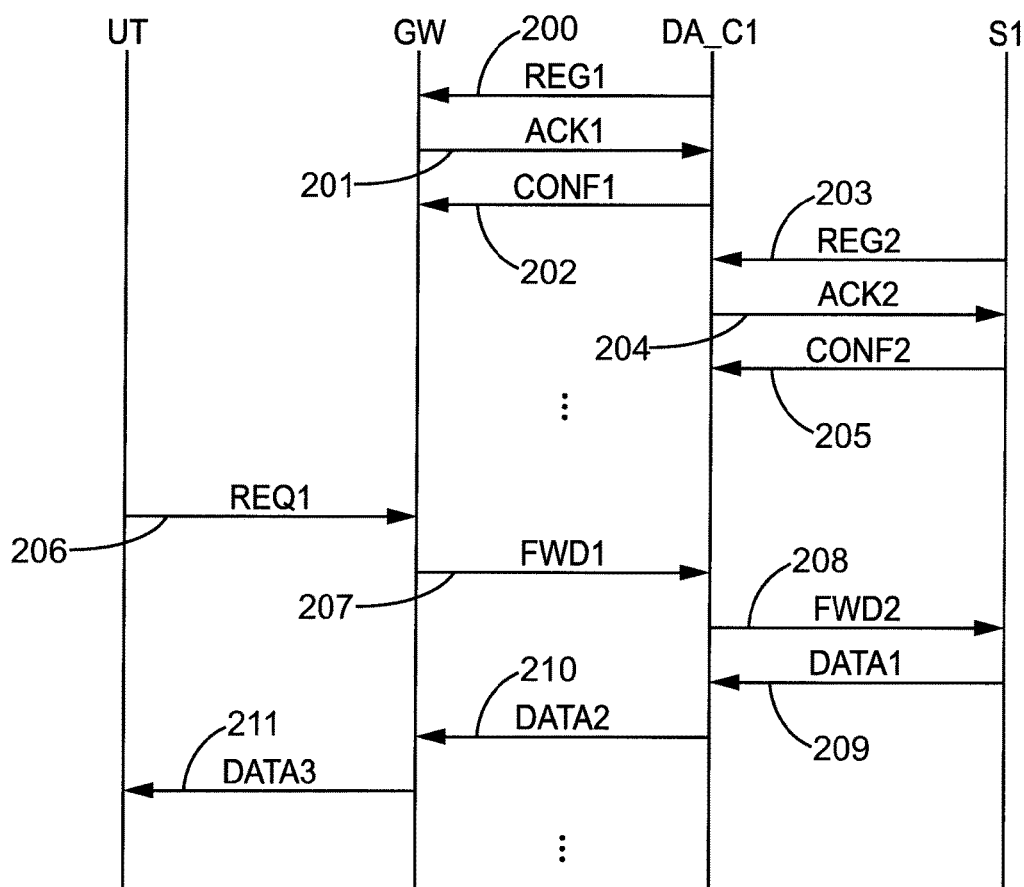
FIG. 9 is a diagram illustrating communications between nodes of the network represented on FIG. 1.

The steps introduced referring to FIG. 7 can also be applied to route a content request from the gateway 1 to the data collector 2.1, as it will be further explained referring to FIG. 9.

Figure 8:
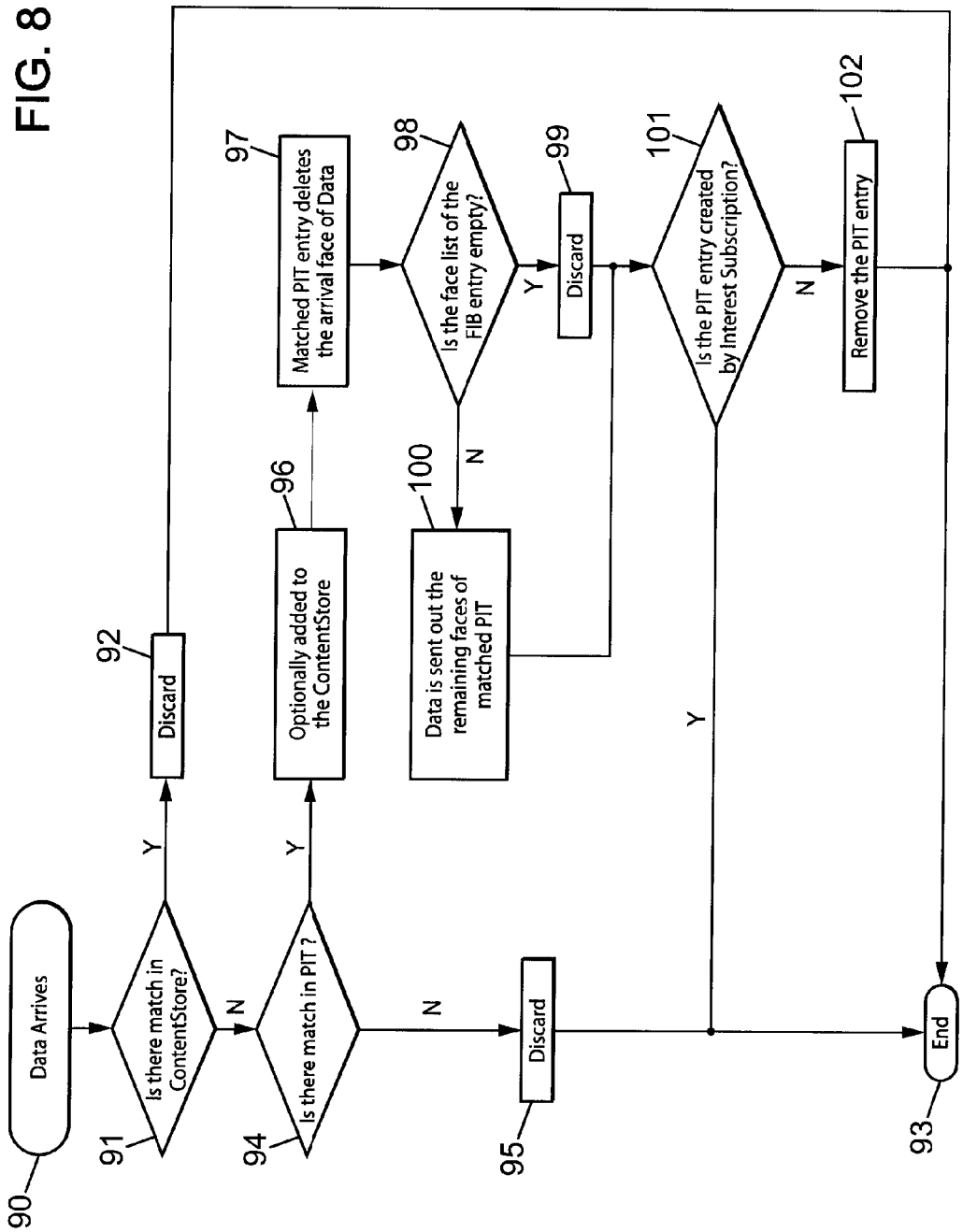
FIG. 8 is a flowchart representing steps of a data packet routing at a first node according to some embodiments of the invention.

FIG. 8 is a flowchart illustrating the steps of a method for routing data packets in a first node according to some embodiments of the invention.

In what follows, the same example as the examples used for describing FIGS. 5 to 7 is used. The first node is then the data collector 2.1 and the second node is the sensor 3.11.

At step 90, the data collector 2.1 receives a data packet, for example the Data packet previously introduced when referring to FIGS. 3.*a* to 3.*c*, from the sensor 3.11.

At step 91, the data collector 2.1 checks in the ContentStore whether the content identified by the content identifier of the Data packet is already stored in the ContentStore of the data collector 2.1.

If the content contained in the Data packet is already stored in the ContentStore, then the data collector 2.1 discards the Data packet at step 92. The routing of the Data packet then ends at step 93.

If the content contained in the Data packet is not stored in the ContentStore of the data collector 2.1, the data collector 2.1 checks whether the content identifier contained in the Data packet corresponds to an URL component stored in the database PIT. For example, when receiving a Data packet from the sensor with a content identifier being "/temperature123", the data collector 2.1 can look up in the database PIT to detect an identifier of a requesting entity associated with the content identifier being "/temperature123". Alternatively, the content identifier in the Data packet can be "0x0093", that is to say the unique identifier of the sensor 3.11, and the data collector 2.1 can deduce from the database FIP that the unique identifier "0x0093" corresponds to the URL component "/temperature123".

If the content identifier of the Data packet is stored in the database PIT, then the data collector 2.1 can optionally store in the ContentStore, at step 96, the content contained in the Content Object field 30.7, 31.5 or 32.6 of the Data packet. Then, at step 97, the data collector 2.1 can delete the content identifier of the Data packet from the database PIT.

At step 98, the data collector 2.1 checks whether identifiers of requesting entities are associated to the content identifier contained in the Data packet, in the database PIT.

If no identifier of requesting entity is associated with the content identifier contained in the Data packet, then the data collector 2.1 discards the Data packet at step 99.

If at least one identifier of requesting entity is associated with the content identifier contained in the Data packet received at step 90, then the data collector 2.1 sends at step 100 the Data packet to all the requesting entities which identifier of requesting entity is associated with the content identifier contained in the Data packet.

After step 100 or step 99, the data collector 2.1 checks, at step 101, whether the entry of the database PIT associating the identifiers of the requesting entities with the content identifier contained in the Data packet has been created by an Interest Subscription packet.

If the entry of the database PIT has been created by an Interest Subscription packet, then the routing of the Data packet ends at step 93.

If the entry of the database PIT has not been created by an Interest Subscription packet, then the data collector 2.1 removes the entry from the database PIT at step 102 and the routing of the Data packet ends at step 93.

The present invention therefore relies on content name-based addressing in the network. In addition to the IP address that is treated as the routing interface in the current known CCN architectures, the present invention may use the MAC address of the network nodes to denote the interface in the routing table (database FIP for example). The routing table can identify whether the interface refers to IP address or MAC address. In addition, as the present invention allows the content identifier to be expressed with Compressed Mode I or Compressed Mode II in the packets, the unique identifiers of the nodes are mapped on URL components prior to the content centric routing, during content registration. The URL components can then be converted into unique identifiers of nodes after a routing decision has been made. In addition, it is to be noted that the present invention enables to convert into unique identifiers some URL components of an initial complete URL by using the Compressed Mode II.

The network layer routing in the present invention has a focus similar to RPL protocol except that the present invention is based on the MAC address instead of the IPv6 address considered in RPL. The major objective is to maintain the topology in a multi-hop wireless network with the Directed Acyclic Graphs (DAGs). Thus, the present invention has a protocol architecture which is lighter than the architecture based on 6LoWPAN and CoAP because a node may perform a direct execution when receiving a command without any operations regarding the IP protocol. Furthermore, the tighter coupling between the MAC layer and the content layer is helpful to keep the flexibility offered by the upper layers based on URL-like content identifiers.

FIG. 9 is a diagram illustrating communication within the network represented on FIG. 1.

At steps 200 to 202, the content locally stored at the data collector 2.1 is registered in the gateway 1. Thus, the gateway 1 is the first node and the data collector 2.1 is the second node during steps 200 to 202.

At step 200, the data collector 2.1 sends a Content Registration packet to the gateway 1, as explained with reference to FIG. 5. The Content Registration packet may comprise the URL component "/room_9" identifying the content locally stored at the data collector 2.1, and a unique identifier "0x0039" of the data collector 2.1.

Upon reception of the Content Registration packet, the gateway 1 checks whether the URL component "/room_9" is valid, as previously explained.

At step 201, considering that the URL component "/room_9" is valid, the gateway 1 sends a Content Registration ACK packet to the data collector, the Content Registration ACK packet comprising the URL component "/room_9" and the unique identifier "0x0039".

According to some embodiments, at step 202, the data collector 2.1 sends a confirmation packet to the gateway 1, the confirmation packet comprising the URL component "/room_9" and the unique identifier "0x0039".

The content locally stored in room 9 is therefore registered in the gateway 1.

At steps 203 to 205, the content locally stored at the sensor 3.11 is registered in the data collector 2.1. Thus, the data collector 2.1 is the first node and the sensor 3.11 is the second node during steps 203 to 205.

At step 203, the sensor 3.11 sends a Content Registration packet to the data collector 2.1, as explained with reference to FIG. 5. The Content Registration packet may comprise the URL component "/temperature" identifying the content locally stored at the sensor 3.11, and a unique identifier "0x0093" of the sensor 3.11.

Upon reception of the Content Registration packet, the data collector 2.1 checks whether the URL component "/temperature" is valid, as previously explained.

At step 201, considering that the URL component "/temperature" is not valid, the data collector 3.1 sends a Content Registration ACK packet to the sensor 3.11, the Content Registration ACK packet comprising a valid URL component "/temperature123" and the unique identifier "0x0093".

According to some embodiments, at step 205, the sensor 3.11 sends a confirmation packet to the data collector 2.1, the confirmation packet comprising the URL component "/temperature123" and the unique identifier "0x0093" of the sensor 3.11.

The content locally stored in the sensor 3.11 is therefore registered in the data collector 2.1, which can store the association between the URL component "/temperature123" and the unique identifier "0x0093" in the database FIB 231.

At step 206, a user terminal, such as the web browser 4 for example, sends a request content, being an Interest packet, to the gateway 1. The Interest packet comprises, in the Content Identifier field 30.6, 31.4 or 32.5, the content identifier in the form of the complete URL "/Orange.com/Office/room_9/temperature123".

The gateway 1 detects that the URL component "/Orange.com/Office" corresponds to the content that it stores itself in the network. The gateway also detects in its database FIB that the complete URL also comprises the URL component "/room_9" which is associated with the unique identifier "0x0039" of the data collector 2.1. The Interest packet can then be modified to delete the URL component "/Orange.com/Office" and to replace the URL component "room_9" by the unique identifier "0x0039" of the data collector 2.1. The gateway also creates an entry in the database PIT associating the remaining part (current component) of the complete URL, when the URL component "/Orange.com/Office" has been deleted, that is to say "koom_9/temperature123", in association with an identifier of the requesting entity, that is to say an identifier of the browser 4.

At step 207, the Interest packet is forwarded to the data collector 2.1.

The data collector 2.1 detects that the content identifier of the Interest packet comprises the unique identifier "0x0039", which corresponds its own unique identifier. The data collector 2.1 also detects in its database FIB that the content identifier of the Interest packet also comprises the URL component "/temperature123" which is associated with the unique identifier "0x0093" of the data sensor 3.11. The Interest packet can then be modified to delete the unique identifier "0x0039" and to replace the URL component "/temperature123" by the unique identifier "0x0093" of the data sensor 3.1. The data collector 2.1 also creates an entry in its database PIT associating the remaining part of the content identifier, when the unique identifier "0x0039" has been deleted, that is to say "temperature123", in association with an identifier of the requesting entity, that is to say an identifier of the gateway 1.

The data collector 2.1 then forwards the content request to the sensor 3.11 at step 208.

The sensor 3.11 detects that the Interest packet comprises the content identifier "0x0093", which is the unique identifier of sensor 3.11. The sensor 3.11 then generates a Data packet comprising as content identifier the unique identifier "0x0093" and comprising, in the Content Object field 30.7, 31.5 or 32.6, the content locally stored at the sensor 3.11.

The sensor 3.11 sends the Data packet to the data collector 2.1 at step 209.

Upon reception of the Data packet, the data collector 2.1 detects that the content identifier is the unique identifier "0x0093", which is associated to the URL component "/temperature123" in the database FIB of the data collector 2.1, said URL component "/temperature123" being associated with the identifier of the gateway 1 in the database PIT. The data collector then determines that the Data packet is to be forwarded to the gateway 1. As the content request is an Interest request, the entry in the database PIT can be removed. In addition, the content identifier of the Data packet can be modified by replacing the unique identifier "0x0093" of the sensor 3.11 by the URL component "/temperature123" and by adding the unique identifier "0x0039" of the data collector 2.1. The modified content identifier is thus "/room_9/temperature123"

At step 210, the data collector 2.1 sends the Data packet to the gateway 1.

Upon reception of the Data packet, the gateway 1 detects that the content identifier comprises the unique identifier "0x0039", which is associated to the URL component "/room_9" in the database FIB of the gateway 1. Thus, the content identifier of the Data packet is equivalent to the URL component "/room_9/temperature123", which is associated with the identifier of the browser 4 in the database PIT of the gateway 1. The gateway 1 then determines that the Data packet is to be forwarded to browser 4. As the content request is an Interest request, the entry in the database PIT can be removed. In addition, the content identifier of the Data packet can be modified by replacing the unique identifier "0x0039" of the data collector 2.1 by the URL component "/room_9" and by adding the URL component identifying the gateway 1. The modified content identifier is thus the complete URL "/Orange.com/Office/room_9/temperature123".

The gateway 1 then forwards the Data packet to the browser 4 at step 211.

It is to be noted that the example of a network comprising a gateway, two data collectors and two sensors has been considered, for the sake of better understanding. However, the invention is not restricted to such a network and can be extended to any Content Centric Network.

The invention claimed is:

1. A method for routing data at a first node of a network comprising at least a second node, wherein the method comprises the following acts performed by the first node:

registering in a first database at the first node a content locally stored in the second node by storing in said first database an association between a Uniform Resource Locator (URL) component identifying said locally stored content and a unique identifier of the second node that is specified by the second node;

receiving from a requesting entity a content request comprising a content identifier, wherein the content identifier comprises an identifier of the first node and a current URL identifier; and checking in said first database whether said current URL identifier comprises said URL component associated with said unique identifier of the second node, and when said current URL identifier comprises said URL component associated with said unique identifier of the second node:

deleting the unique identifier of the first node from the content identifier and replacing the current URL identifier by the unique identifier of the second node, in the content identifier, after deleting, forwarding the content request to the second node, storing in a second database a second URL component identifying the content requested by the requesting entity in association with an identifier of said requesting entity, and receiving a data packet comprising at least a part of the requested content from the second node, and sending the data packet to the requesting entity for which the identifier is associated with the second URL component in the second database.

2. The method according to claim 1, wherein the method further comprises, prior to forwarding the content request to the second node:
checking whether the requested content is stored by said first node, and
sending from the first node said requested content to the requesting entity if the requested content is locally stored by the first node.

3. The method according to claim 1, wherein the requested content is identified, in the data packet transmitted between the first node and the second node, by said unique identifier of the second node.

4. The method according to claim 3, wherein the requested content is identified, in the data packet transmitted between the first node and the requesting entity, by the second URL component.

5. The method according to claim 1, wherein the method further comprises, after sending the data packet to the requesting entity, deleting said association in the second database.

6. The method according to claim 1, wherein, the content request being a subscription request, the data packet is sent by the first node each time the requested content is updated, said data packet comprising an updated version of the requested content.

7. The method according to claim 1, wherein, the requested content being dynamically updated, the content request comprises a command for sending said content if the updated content fulfils a predetermined criterion, and wherein the data packet is sent from the second node if said criterion is fulfilled by the updated requested content.

8. The method according to claim 1, wherein the first node is a data collector, the second node is a sensor and a sender of the content request is a gateway accessible by a user via a web browser.

9. The method according to claim 1, wherein the first node is a gateway accessible by a user via a web browser, the second node is a sensor and the requesting entity is the web browser of the user.

10. The method according to claim 1, wherein the first node is a gateway accessible by a user via a web browser, the second node is a data collector connected to at least one sensor storing the locally stored content, and the requesting entity is the web browser of the user.

11. A non-transitory computer-readable medium comprising a computer program product recorded thereon and executable by a computer in the form of a software agent including at least one software module setup to implement a method for routing data at a first node of a network comprising at least a second node, wherein the software module configures the first node to perform acts comprising:
registering in a first database at the first node a content locally stored in the second node by storing in said first database an association between a Uniform Resource Locator (URL) component identifying said locally stored content and a unique identifier of the second node that is specified by the second node;
receiving from a requesting entity a content request comprising a content identifier, wherein the content identifier comprises an identifier of the first node and a current URL identifier; and
checking in said first database whether said current URL identifier comprises said URL component associated with said unique identifier of the second node, and when said current URL identifier comprises said URL component associated with said unique identifier of the second node:
deleting the unique identifier of the first node from the content identifier and replacing the current URL identifier by the unique identifier of the second node, in the content identifier,
after deleting, forwarding the content request to the second node,
storing in a second database a second URL component identifying the content requested by the requesting entity in association with an identifier of said requesting entity, and
receiving a data packet comprising at least a part of the requested content from the second node, and sending the data packet to the requesting entity for which the identifier is associated with the second URL component in the second database.

12. A routing device for routing data in a network comprising at least one node, wherein the routing device comprises:
a first database storing at least one association between:
a Uniform Resource Locator (URL) component identifying a content at the routing device, and
a unique identifier associated to the node, said unique identifier being generated by the node,
a second database storing at least identifiers of requesting entities;
a processing unit which is configured to register a content locally stored in the node by storing in a memory that comprises said first database an association between an URL component identifying said locally stored content and said unique identifier of the node,
an interface configured to receive, from a requesting entity, a content request comprising a content identifier, wherein the content identifier comprises an identifier of the first node and a current URL identifier,
wherein the processing unit is configured to check in said first database whether said current URL identifier comprises said URL component associated with said unique identifier of the node, and when said current URL identifier comprises said URL component associated with said unique identifier of the node:
delete the unique identifier of the first node from the content identifier and replace the current URL identifier by the unique identifier of the node, in the content identifier,
after deleting and replacing, forward the content request to the node,
store in the second database a second URL component identifying the content requested by the requesting entity in association with an identifier of said requesting entity,
receive a data packet comprising at least a part of the requested content from the node, and send the data packet to the requesting entity for which the identifier is associated with the second URL component in the second database.

13. A network for routing data comprising:
at least a first node; and
a second node,
wherein the first node comprises:
a first database storing at least one association between:
a Uniform Resource Locator (URL) component identifying a content at the first node, and a unique identifier associated to the second node, said identifier being generated by the second node, a second database storing at least identifiers of requesting entities;

a processing unit which is configured to register a content locally stored in the second node by storing in a memory that comprises said first database an association between an URL component identifying said locally stored content and said unique identifier of the second node, and an interface configured to receive, from a requesting entity, a content request comprising a content identifier, wherein the content identifier comprises an identifier of the first node and a current URL identifier, wherein the processing unit is configured to check in said first database whether said current URL identifier comprises said URL component associated with said unique identifier of the second node, and when said current URL identifier comprises said URL component associated with said unique identifier of the second node:

delete the unique identifier of the first node from the content identifier and replace the current URL identifier by the unique identifier of the second node, in the content identifier, after deleting and replacing, forwarding the content request to the second node, store in a second database a second URL component identifying the content requested by the requesting entity in association with an identifier of said requesting entity, and receive a data packet comprising at least a part of the requested content from the second node, and send the data packet to the requesting entity for which the identifier is associated with the second URL component in the second database.

* * * * *